(12) United States Patent
Webster

(10) Patent No.: US 9,145,846 B2
(45) Date of Patent: Sep. 29, 2015

(54) GAS TURBINE ENGINE EXHAUST NOZZLE INCLUDING A PLURALITY OF FLAPS MOVABLE OVER A FLOW CONTROL SURFACE

(75) Inventor: John R. Webster, Derby (GB)

(73) Assignee: ROLLS-ROYCE plc, London (GB)

( * ) Notice: Subject to any disclaimer, the term of this patent is extended or adjusted under 35 U.S.C. 154(b) by 731 days.

(21) Appl. No.: 13/536,293

(22) Filed: Jun. 28, 2012

(65) Prior Publication Data

US 2013/0017065 A1  Jan. 17, 2013

(30) Foreign Application Priority Data

Jul. 14, 2011 (GB) .................................. 1112045.8

(51) Int. Cl.
| | |
|---|---|
| F02K 1/12 | (2006.01) |
| F02K 1/46 | (2006.01) |
| F02K 1/38 | (2006.01) |
| F02K 1/00 | (2006.01) |
| F02K 1/80 | (2006.01) |

(52) U.S. Cl.
CPC . *F02K 1/46* (2013.01); *F02K 1/006* (2013.01); *F02K 1/1207* (2013.01); *F02K 1/386* (2013.01); *F02K 1/805* (2013.01); *F05D 2300/505* (2013.01)

(58) Field of Classification Search
CPC ......... F02K 1/1207; F02K 1/386; F02K 1/46; F02K 1/805; F02K 1/12; F02K 1/06
USPC .................................................... 60/770, 771
See application file for complete search history.

(56) References Cited

U.S. PATENT DOCUMENTS

| 3,362,431 | A | * | 1/1968 | Chaulin ......................... 137/896 |
| 3,976,160 | A | * | 8/1976 | Hoch et al. ..................... 181/215 |
| 4,132,068 | A | * | 1/1979 | Johnston ....................... 60/226.2 |
| 4,422,524 | A |   | 12/1983 | Osborn |
| 4,575,006 | A | * | 3/1986 | Madden ................... 239/265.29 |
| 4,747,543 | A | * | 5/1988 | Madden ..................... 239/127.3 |
| 4,934,600 | A | * | 6/1990 | Nash et al. ................. 239/127.1 |
| 5,908,159 | A | * | 6/1999 | Rudolph .................. 239/265.17 |
| 7,628,356 | B2 | * | 12/2009 | Buffenoir et al. ........... 244/23 D |

FOREIGN PATENT DOCUMENTS

| EP | 1 726 811 A2 | 11/2006 |
| EP | 1 873 386 A2 | 1/2008 |
| EP | 2 184 481 A2 | 5/2010 |
| GB | 849502 | 9/1960 |

(Continued)

OTHER PUBLICATIONS

Oct. 25, 2011 Search Report issued in British Patent Application No. GB1112045.8.

(Continued)

Primary Examiner — William H Rodriguez
(74) Attorney, Agent, or Firm — Oliff PLC

(57) ABSTRACT

A gas turbine engine exhaust nozzle comprises a nozzle body 8 defining a nozzle exit 6. An array of movable slats 16, 18 is disposed round the nozzle exit 6. Flow control walls 20 are fixed to the nozzle body 8 and provide flow control surfaces 22 over which the movable slats 16, 18 move. The flow control walls 20 prevent leakage of gas at the edges of the movable slats 16, 18, so improving performance of the exhaust nozzle.

28 Claims, 5 Drawing Sheets

(56) References Cited

FOREIGN PATENT DOCUMENTS

| GB | 877010 | 9/1961 |
| GB | 913057 | 12/1962 |
| GB | 1 368 649 | 10/1974 |
| GB | 2 153 454 A | 8/1985 |
| GB | 2 374 121 A | 10/2002 |
| WO | WO 2008/045069 A1 | 4/2008 |

OTHER PUBLICATIONS

Jul. 18, 2014 European Search Report issued in European Application No. 12 17 4092.

\* cited by examiner

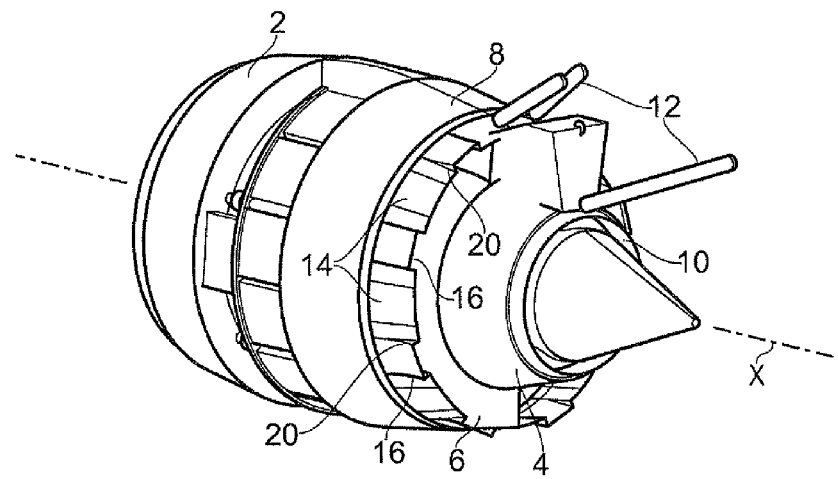
FIG. 1
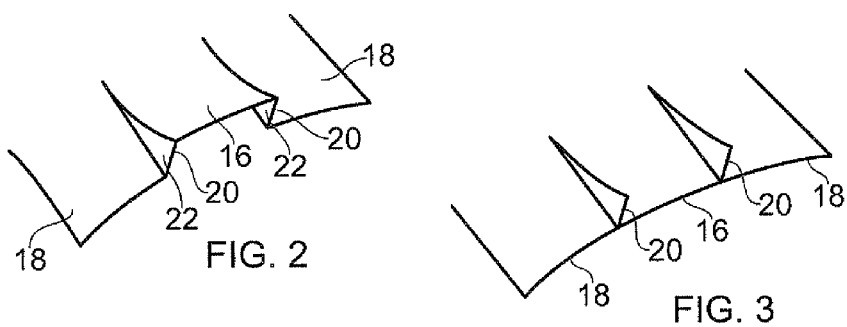
FIG. 2
FIG. 3
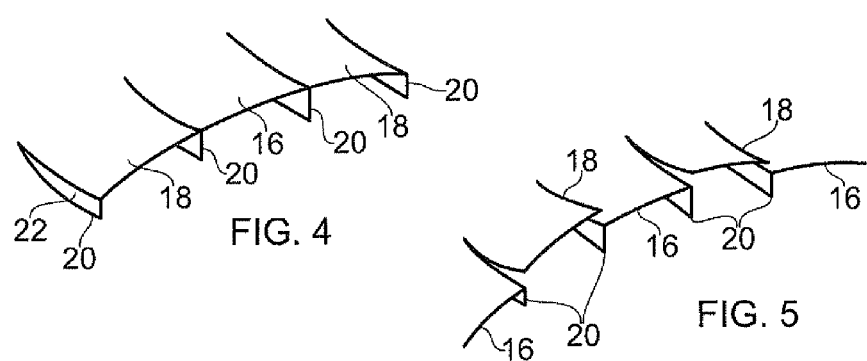
FIG. 4
FIG. 5

GAS TURBINE ENGINE EXHAUST NOZZLE INCLUDING A PLURALITY OF FLAPS MOVABLE OVER A FLOW CONTROL SURFACE

This invention claims the benefit of UK Patent Application No. 1112045.8, filed on 14 Jul. 2011, which is hereby incorporated herein in its entirety.

FIELD OF THE INVENTION

This invention relates to a gas turbine engine exhaust nozzle, and in particular to a variable area exhaust nozzle.

BACKGROUND TO THE INVENTION

Gas turbine engines are widely used to power aircraft. As is well known, the engine basically provides propulsive power by generating a high velocity stream of gas which is exhausted rearwards through an exhaust nozzle. A single high velocity gas stream is produced by a turbo jet gas turbine engine. More commonly nowadays, however, two streams, a core exhaust and a bypass exhaust, are generated by a ducted fan gas turbine engine or bypass gas turbine engine.

The optimum area of the nozzle exit of a gas turbine engine exhaust nozzle depends on a variety of factors, such as the ambient conditions of temperature and pressure, and the mass flow of exhaust gas, which depends on the operating condition of the engine. Aircraft engines spend a substantial proportion of their life at cruise, and consequently nozzle exit areas are normally optimised for cruise conditions. Over the operating cycle of the engine, this provides the optimum overall performance and fuel efficiency. However, on takeoff, when the power requirement of the engine is greater than at cruise, the optimum nozzle exit area is greater than it is at cruise, and decreases during climb. Variable area nozzles have been proposed in order to modulate the nozzle exit area during takeoff and climb. An example of such a variable area nozzle is disclosed in GB 2374121, and comprises a series of tabs at the nozzle exit, alternative ones of which are displaceable radially outwardly relative to fixed tabs in order to provide an increase in the nozzle exit area.

Outward displacement of a movable tab opens gaps between its circumferential edges and the adjacent fixed tabs, and these gaps allow leakage of the exhaust gas flow, which generates vortices and so reduces the performance of the engine. Furthermore, excessive movement of the movable tabs away from the optimum nozzle shape can cause excessive flow turning, which can lead to separation. These factors reduce the $C_v$ of the nozzle, $C_v$ being a measure of the nozzle efficiency.

STATEMENTS OF INVENTION

According to the present invention there is provided a gas turbine engine exhaust nozzle having a nozzle exit and comprising an annular nozzle body and a plurality of slats which extend generally axially of the nozzle body and are distributed around the nozzle exit, at least some of the slats being movable radially with respect to the nozzle axis, flow control surfaces being provided on the nozzle body adjacent the movable slats, whereby circumferential edges of the movable slats move over the flow control surfaces during movement of the slats.

The flow control surfaces thus prevent leakage at the circumferential edges of the movable slats, so eliminating or reducing any performance reduction resulting from such leakage.

The flow control surfaces may extend over the full range of movement of the respective movable slat edges. However, in some embodiments, it may be desirable for the movable slats to be displaceable to positions beyond the extent of the flow control surfaces.

The flow control surfaces may be provided on flow control walls which are fixed with respect to the nozzle axis. The flow control walls may be disposed between adjacent ones of the slats, whereby respective circumferential edges of the adjacent slats are movable over respective oppositely disposed flow control surfaces of respective common flow control walls.

Each movable slat may be movable between a nominal position and an area-adjusted position. In some embodiments, the slats may be movable in one direction only from the nominal position, but in other embodiments the slats are movable in both directions from the nominal position so as to assume respective area-adjusted positions which can provide, selectively, a greater or smaller area respectively than is provided in the nominal position. In some embodiments, each movable slat may be operable to assume any one of a plurality of area-adjusted positions between the nominal position and a limit area-adjusted position.

The nominal position may correspond to an optimum nozzle exit area for a cruise operating condition of the engine.

When the movable slats are in their nominal positions, the nozzle exit may have a castellated configuration, as viewed axially of the nozzle.

Cooperating means may be provided on the slats and the flow control walls for arresting movement of the slats in a limit position. The cooperating means may include sealing means for providing a seal between each slat and the adjacent flow control walls in the limit position. The cooperating means may comprise a plurality of spaced stop elements distributed axially with respect to the nozzle axis. The spaced stop elements thus engage each slat at different positions along the slat, to establish a desired shape of the slat in its limit position.

A sealing element may be carried by each movable slat at its circumferential edge, the sealing element being in sliding contact with the flow control surface. In operation, the sealing element provides a seal between the slat and the flow control surface as the slat travels over the flow control surface.

The cooperating means may comprise slots in the flow control walls which are engaged by respective pegs mounted on the movable slats, whereby at least one end of each slot defines the limit position for the respective slat. Each flow control surface may have axially spaced slots, in which respective pegs of the adjacent movable slat engages. The ends of the respective slots thus serve to establish the shape of the slat in its limit position.

The cooperating means may comprise a latch mechanism, for example in the form of a latch recess in the flow control wall which is engagable by a latch element on the adjacent movable slat.

The flow control walls may be carried by fixed slats disposed between adjacent movable slats. The fixed slats may have axially extending regions which are radially offset with respect to each other. The axial extending regions may define at least two axially extending channels disposed circumferentially side-by-side, the channels opening respectively in the radially inward and outward directions.

In an alternative embodiment, the flow control walls may be carried directly by the nozzle body, and extend between adjacent movable slats. In such an embodiment, each two adjacent movable slats cooperate with oppositely disposed flow control surfaces of the respective flow control wall disposed between them.

The circumferential width of the flow control wall may reduce in the direction away from the nozzle body. Thus, the flow control wall has a thicker region at its junction with the nozzle body, in order to strengthen the connection between the nozzle body and the flow control wall. An alternative strengthening measure for the connection between each flow control wall and the nozzle body is for the flow control wall to have a radial dimension at the junction with the nozzle body which is greater than the radial thickness of the nozzle body at the junction.

At least one of the flow control surfaces of a respective flow control wall may lie in a plane which is oblique to the nozzle axis.

Each flow control wall may a reinforcing web which extends laterally of the flow control wall and overlaps an adjacent one of the movable slats. Each flow control wall may have a reinforcing web on each side. The or each reinforcing web may be disposed radially inwardly or radially outwardly of the respective movable slat which it overlaps, and in some embodiments there may be two reinforcing webs on each side of each flow control wall, one disposed radially outwardly and one disposed radially inwardly of the respective movable slat.

At least part of each flow control wall may be pivotable with respect to the nozzle body so as to lie parallel to an adjacent region of the nozzle body.

A variety of mechanisms may be employed to move the movable slats. In one embodiment, each movable slat may be made from a shape memory material, such as a shape memory alloy, and control means may be provided for actuating the material to induce movement of the respective slat. In an alternative embodiment, each movable slat may be substantially rigid, and hinged to the nozzle body.

The present invention also provides a gas turbine engine provided with an exhaust nozzle as defined above.

BRIEF DESCRIPTION OF THE DRAWINGS

For a better understanding of the present invention, and to show more clearly how it may be carried into effect, reference will now be made, by way of example, to the accompanying drawings, in which:

FIG. 1 shows a ducted fan gas turbine engine;

FIG. 2 is a partial view of a nozzle exit of the gas turbine engine of FIG. 1 in a nominal configuration;

FIG. 3 corresponds to FIG. 2, but shows the nozzle exit in a reduced-area configuration;

FIG. 4 corresponds to FIGS. 2 and 3 but shows the nozzle exit in an increased-area configuration;

FIG. 5 corresponds to FIG. 4, but shows the nozzle exit in an enhanced increased-area configuration;

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 6:
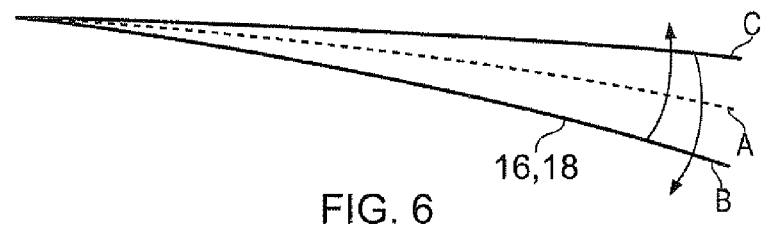
FIG. 6 is a schematic representation of the range of movement of a movable slat of an alternative embodiment of a nozzle exit.

FIG. 1 shows a ducted fan gas turbine engine comprising a nacelle 2 which, with an outer casing of a core engine 4, defines a bypass duct terminating at an annular fan exhaust nozzle having a nozzle exit 6. The rear part of the nacelle 2 comprises a body 8 of the exhaust nozzle. The core engine 4 has a separate combustion exhaust nozzle 10. FIG. 1 also shows, in schematic form, support links 12 for supporting the engine on an airframe.

As is known, air is drawn to the engine through an air intake at the forward end, and is compressed and accelerated by a fan (not shown). The air from the fan is split between the core engine flow and a bypass flow. The core engine flow enters the core engine 4, flows through core engine compressors where it is further compressed, and into a combustor (not shown) where it is mixed with fuel. Combustion of the fuel with the compressed air generates a high energy and velocity gas stream which exits the combustor and flows downstream through turbines (not shown). As the high energy gas stream flows through the turbines it rotates turbine rotors extracting energy from the gas stream which is used to drive the fan and compressors via respective engine shafts. On exiting the turbines, the high energy gas stream still has a significant amount of energy and velocity and it is exhausted, as a core exhaust stream, through the combustion exhaust nozzle 10 to provide propulsive thrust. The remainder of the air from the fan flows within the bypass duct around the core engine 4 and exits through the fan exhaust nozzle to provide further useful propulsive thrust.

The following description makes specific reference to the bypass exhaust nozzle exit 6, although it will be appreciated that the features described are applicable, with appropriate modification, also to the combustion exhaust nozzle 10.

It will be appreciated from FIG. 1 that the annular nozzle exit 6 of the bypass exhaust nozzle is bounded at its outer diameter by an array of fixed tabs or slats 14 and movable tabs or slats 16. In the embodiment shown in FIG. 1, the movable slats 16 are made from a shape memory alloy, or incorporate an element made from a shape memory alloy, and so can assume different configurations under different temperature conditions. Such materials, and means for controlling them, are well known in the art, and consequently will not be discussed in detail in this specification.

It will be appreciated from FIG. 1 that adjusting the configurations of the movable slats 16 to take their free edges further from, or closer to, the annulus defined by the free edges of the fixed tabs 14 will vary the overall area of the exhaust nozzle exit. This area can thus be adjusted, within limits, in order to match it to the air mass flow rate through the bypass duct in different operating conditions of the engine (e.g. takeoff, climb, top of climb (TOC) and cruise.

FIG. 1 illustrates the basic principle underlying the present invention, but specific examples will be discussed below with reference, initially, to FIGS. 2 to 5.

FIGS. 2 to 5 show an embodiment in which the fixed slats 14 of FIG. 1 are replaced by further movable slats 18, so that the nozzle exit 6 is surrounded by a first set of slats 16 and a second set of slats 18. All of the slats 16 of the first group of slats are operable together, so that, in normal circumstances, they assume the same configuration as each other. The same is true of the second group of slats 18, which, again, normally assume the same configuration as each other. It will be appreciated from FIG. 2 that, in the nominal configuration, the first group of slats 16 are positioned radially outwardly of the second group of slats 18, with respect to the engine axis X (FIG. 1).

Flow control walls 20, which lie in respective substantially radial planes with respect to the engine axis X are situated between adjacent slats 16, 18. Thus, in the nominal configuration shown in FIG. 2, the exhaust exit has a castellated form at its downstream edge when viewed in the direction of the axis X. Such a castellated configuration has been found, in fixed area exhaust nozzles, to have a beneficial effect in reducing noise generated by the exhaust gas flow.

The flow control walls 20 are fixed with respect to the nozzle body 8 and so, as the slats 16, 18 move between configurations, they sweep past flow control surfaces 22 constituted by the opposite side faces of the flow control walls 20.

FIG. 3 shows a reduced area configuration of the slats 16, 18. In this configuration, the first group of slats 16 have moved radially inwardly while the second group of slats 18 have remained in their nominal positions. Consequently, the slats 16, 18 are aligned circumferentially, to form a generally circular outer periphery of the nozzle exit 6. Since the flow control walls 22 are fixed to the nozzle body 8, they now project radially outwardly as fins on the external surface of the nozzle. These fins may adversely affect the performance of the engine, or of the aircraft as a whole, and consequently at least part of the flow control walls 20 may be hinged with respect to the nozzle body 8, so that they may be folded to lie flat against one of the respective adjacent slats 16, 18 to reduce interference with the air flow over the nacelle 2.

FIG. 4 shows the configuration of the slats 16, 18 when an increase in the area of the nozzle exit is required. In this configuration, the first group of slats 16 are in the same position as in the nominal configuration shown in FIG. 2, but the second group of slats 18 have moved radially outwardly to be aligned on the same circumference as the first group of slats 16. In this condition, the flow control walls 20 project inwardly of the nozzle exit 6 and, again, measures may be taken to fold them flat against the inside wall of the nozzle exit 6 to minimise flow disruption.

The configurations shown in FIGS. 2, 3 and 4 may be appropriate for, respectively, cruise, top of climb, and take off of the aircraft on which the engine is installed. It will be appreciated that, in all three configurations, the slats 16 and 18 and the flow control walls 20 cooperate to avoid or minimise any gaps between the inside and outside of the nozzle exit 6 upstream of the free edge. This avoids, or minimises, any reduction in performance resulting from flow disturbances such as vortices which are otherwise generated if leakage occurs between adjacent slats 16, 18.

In some circumstances, it may nevertheless be acceptable to allow a degree of such leakage when the engine is required to deliver maximum thrust, for example on takeoff. Thus, as shown in FIG. 5, it may be possible for the second group of slats 18 to move beyond the radially outer edges of the flow control walls 20 to provide an additional increase in the area of the exhaust nozzle exit 6. Once takeoff and initial climb is completed, the slats 16, 18 will move to the configuration shown in FIG. 4, and then to the configuration shown in FIG. 3 for the remainder of the climb. At the top of climb, the nozzle area will be at its minimum, as shown in FIG. 3. Subsequently the nozzle area will be increased again to the nominal configuration shown in FIG. 2 for the duration of the cruise phase of the flight. It will be appreciated that appropriate area settings can be achieved, in an analogous way, during the landing phase of the flight.

In FIGS. 2 to 5, the slats 16, 18 are shown as being of equal width. However, in other embodiments, the slats 16 and 18 may have different widths in order to provide the required magnitude of area modulation in both the area increasing and area decreasing directions.

In the embodiment shown in FIGS. 2 to 5, each slat 16, 18 is movable in one radial direction only from its nominal position as shown in FIG. 2. Thus, for example, the group of tabs 16 is movable only radially inwardly from the nominal position to the reduced-area position shown in FIG. 3, while the group of slats 18 is movable only radially outwardly from the nominal position shown in FIG. 2, first to the increased area position shown in FIG. 4, and then to the further increased area position shown in FIG. 5.

However, in other embodiments, it is possible for the slats 16, 18, or at least some of them, to be movable in either direction from the nominal position, as represented schematically in FIG. 6. In FIG. 6, the nominal position of the slats 16, 18 is indicated by a dotted line A, and it will be appreciated that the slat 16, 18 can move from the nominal configuration A in either direction to alternative configurations B, C respectively.

Figure 7:
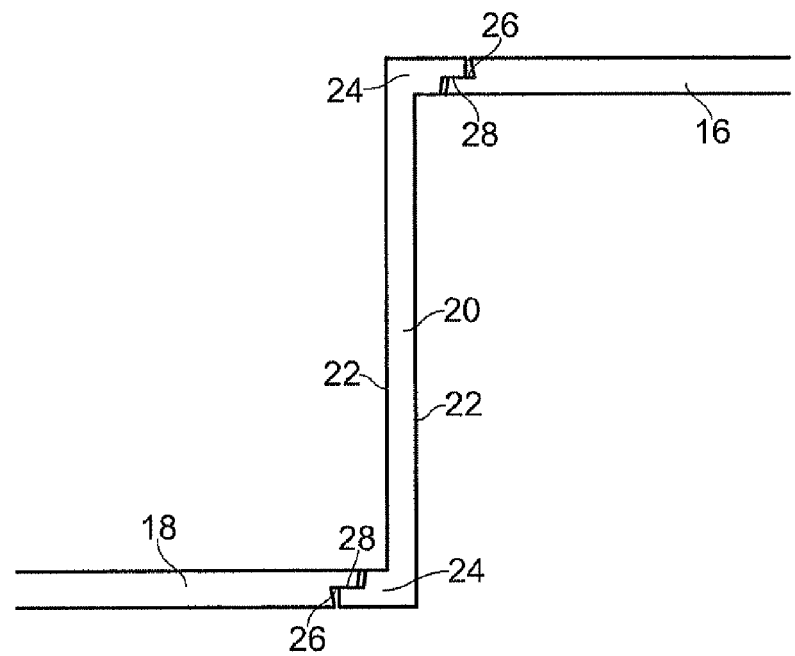
FIG. 7 shows cooperating means between a movable slat and a flow control wall of a nozzle exit.

Although in some circumstances it may be sufficient to allow each slat 16, 18 to find its own position when moved away from the nominal position, in most cases it is desirable for there to be some kind of arresting mechanism to ensure that the respective slats 16, 18 are arrested in a defined position when moved to an increased-area or reduced-area position. FIG. 7 shows one form of such a mechanism. Adjacent slats 16, 18 move with respect to the flow control wall 20 between them, and so move across the respective flow control surfaces 22 of the wall 20. The flow control wall 20 is provided at each radial edge with a respective projection 24. The circumferential edges of the slats 16, 18 and the respective projections 24 are provided with cooperating means in the form of ledges 26, 28 which abut one another when the slats 16, 18 are in their nominal positions.

Figure 8:
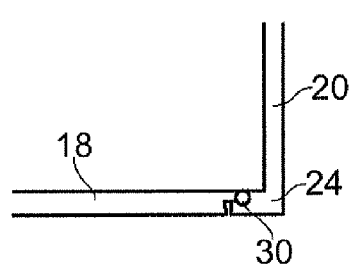
FIGS. 8 and 9 show variants of the configuration shown in FIG. 7.

As shown in FIG. 8, sealing means, for example in the form of a sealing element 30, may be provided on the projection 24 or the adjacent slat 16, 18 in order to prevent any leakage between the ledges 26, 28. Furthermore, in order to avoid leakage also during travel of the slats 16, 18 over the respective flow control surface 22, each slat may be provided at its circumferential edges with wiper sealing elements 32 which make sealing contact with the respective flow control surface 22.

Figure 9:
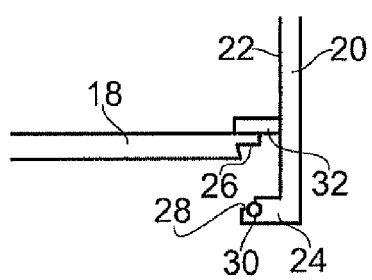

FIGS. 7 to 9 show the cooperating means in the form of the ledges 26, 28, and the sealing means 30, at the nominal positions only of the slats 16, 18. It will be appreciated that similar arrangements may be provided for determining the end positions of the slats 16, 18 in the increased-area and reduced-area positions also.

Figure 10:
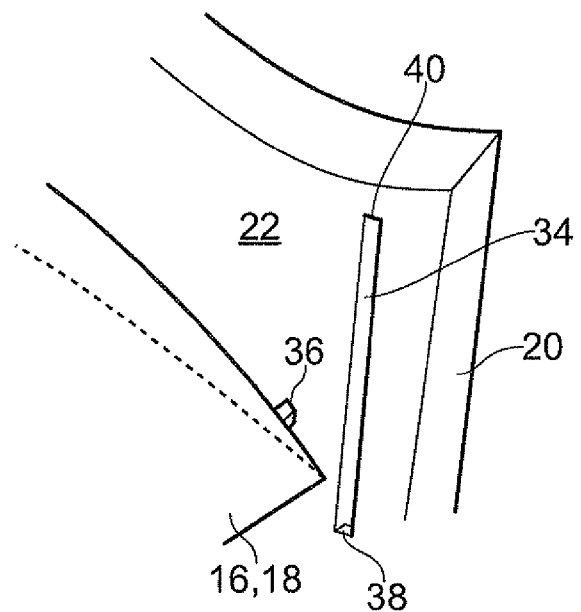
FIG. 10 shows alternative cooperating means between a movable slat and a flow control wall of a nozzle exit.

FIG. 10 shows an alternative cooperating means for establish limit positions of the slats 16, 18. In this embodiment, a slot 34 is provided in the flow control wall 20, and a peg 36 projects from the circumferential edge of the slat 16, 18. As the slat 16, 18 moves between its limit positions, the peg 36 travels along the slot 34. At each limit position, the peg 36 is arrested by the respective end 38, 40 of the slot 34. This embodiment avoids the requirement for the projections 24 in the embodiments of FIGS. 7 to 9, and so reduces disturbances in the flow through the nozzle exit 6 or over the nacelle 2.

It will be appreciated that FIG. 10 shows the slats 16, 18 and the flow control wall 20 separated for clarity.

Figure 11:
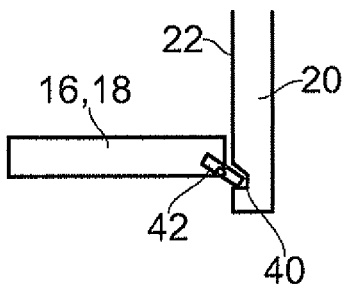
FIG. 11 shows a variant of the configuration shown in FIG. 10.

FIG. 11 shows an alternative to the slot and peg arrangement of FIG. 10, which avoids the need for the slot 34 extending radially over substantially the full extent of the flow control surface 22. In FIG. 11, the cooperating means defining the end position of the slat 16, 18 comprises a latch recess 40 in the flow control wall 20, and a pivoting latch element 42 at the circumferential edge of the slat 16, 18. The latch element 42 is biased, for example by means of a spring, in the anti-clockwise direction as shown in FIG. 11, but is acted upon by a limit stop which prevents such anti-clockwise rotation beyond the position shown in FIG. 11. Consequently, when the slat 16, 18 moves upwardly from the position shown in FIG. 11, the latch element 42 can pivot in the clockwise direction, allowing it to escape from the latch recess 40 and slide along the flow control surface 22 of the flow control wall 20. On returning to the lower position shown in FIG. 11, the latch element 42 re-enters the latch recess 40, to prevent further movement of the slat 16, 18 in the downwards direction.

In the embodiments of FIGS. 7 to 11, single projections 24, peg/slot arrangements 36, 38 and latch elements/latch recesses 40 have been shown for each circumferential edge of the respective slats 16, 18. The projections 24 and the latch elements/latch recesses 42, 40 may each extend in the axial direction over substantially the full extent of the respective circumferential edge of the slat 16, 18. However, in some embodiments, each circumferential edge of each slat 16, 18 may be provided with a plurality of separate stop elements distributed in the axial direction. For example, a plurality of separate projections 24 with ledges 28 may be distributed in the axial direction for engagement at different positions along the respective circumferential edge of the slat 16, 18. Thus, each position along the circumferential edge of the slat 16, 18 is individually positioned with respect to the flow control wall 20 when in its limit position. By appropriate positioning of the separate stop means, the profile of each slat 16, 18 can be defined to ensure that it provides a nozzle exit 6 of the appropriate configuration to optimise performance. Similarly, a series of axially spaced slots 34 may be provided with respective pegs 36 at the circumferential edge of the slat 16, 18, each slot 34 having its ends 38, 40 positioned so as to achieve the desired profile of the slat 16, 18 in each of its limit positions. The same applies to the embodiment of FIG. 11, in that a series of axially spaced latch recesses 40, with corresponding latch elements 42 may be provided.

Figure 12:
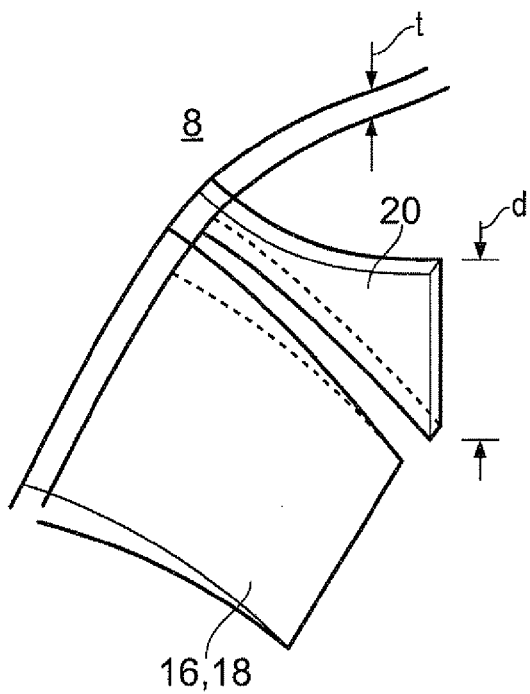
FIG. 12 illustrates a connection between a nozzle body and a flow control wall.
Figure 13:
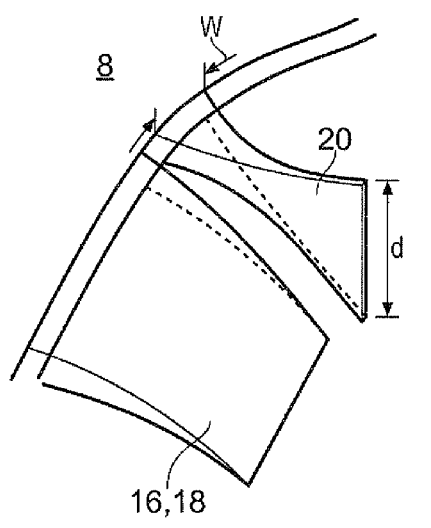
FIGS. 13 to 16 correspond to FIG. 12 but show alternative embodiments.

In embodiments in which the flow control walls 20 are carried by stationary slats 14, as in FIG. 1, the flow control walls 20 are adequately supported along their axial extent. However, in embodiments in which no fixed slats 14 are present, the flow control walls 20 are supported by the nozzle body 8 only at their upstream ends, as shown in FIG. 12. Because the nozzle body 8 has a relatively small thickness t, whereas the flow control walls 20 have an increased radial dimension d at their downstream edges, additional measures may be required to ensure that the junctions between the flow control walls 20 and the nozzle body 8 are sufficiently robust. One such measure is shown in FIG. 13, in which the circumferential width w of the flow control wall 20 is increased at the junction between the nozzle body 8 and the flow control wall 20. This increased width w means that the flow control wall 20 has a profile which increases in radial depth d but decreases in circumferential width w in the downstream direction.

It will be appreciated that the slats 16, 18 and the flow control walls 20 are shown separated from each other in FIGS. 12 to 16, for the purposes of clarity. With regard to FIG. 13, it will be appreciated that the profiles of the circumferential edges of the slats 16, 18 match those of the flow control surfaces 22 of the flow control walls 20.

Figure 14:
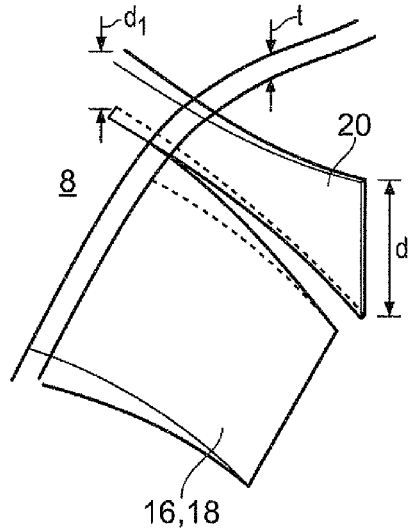

FIG. 14 shows an alternative configuration in which the radial depth $d_1$ of the flow control wall 20 at its junction with the nozzle body 8 is increased, and the region of the junction extends, in the upstream direction, into the nozzle body 8. As will be appreciated from FIG. 1, the nozzle body 8 is part of the nacelle 2, and so may have an increasing thickness in the upstream direction away from the edge at which the slats 16, 18 and the flow control walls 20 are provided. Consequently, the embodiment of FIG. 14 provides a greater degree of support for the flow control walls 20.

Figure 15:
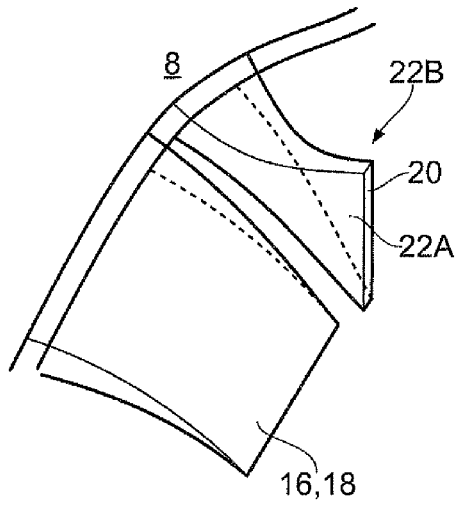

FIG. 15 shows a variant of the embodiment shown in FIG. 13. In the embodiment of FIG. 13 all of the movable slats 16, 18 have a trapezoidal shape, broadening in the circumferential direction with increased axial distance from the nozzle body 8. Since the flow control walls 20 are symmetrical about respective radial planes, the slats 16, 18 on each side of each flow control wall 20 are identical. In the embodiment shown in FIG. 15, the flow control wall 20 is not symmetrical, but has a flow control surface 22A on one side which lies in a radial plane, and a flow control surface 22B on the other side which is oblique with respect to the engine axis X. Consequently, the slat 16, 18 on the side of the flow control wall 20 having the radial flow control 22A is substantially rectangular (assuming that the flow control surface on the other side of the slat 16, 18 is also radial), while the slats 16, 18 between oblique flow control surfaces 22B will be trapezoidal.

Figure 16:
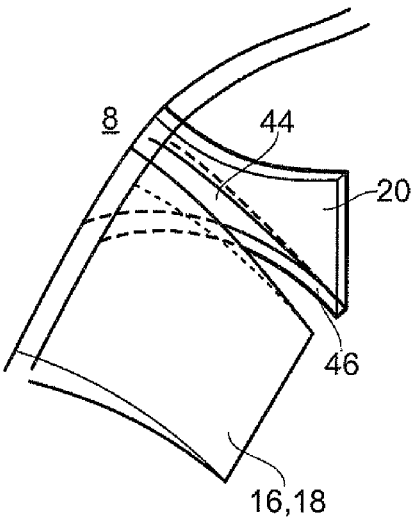

As shown in FIG. 16, one or more additional strengthening webs 44 may be provided, extending between the flow control wall 20 and the nozzle body 8. In the embodiment shown in FIG. 16, the strengthening web 44 has a curved outer edge 46 which is shaped so as to minimise disruption of the gas flow over the slats 16, 18. The web 42 is shown on one side only of the flow control wall 20, and extends beneath (i.e. radially inwards of) the slat 16, 18. A corresponding web 44 may be provided on the opposite side of the flow control wall 20 extending radially inwardly of the adjacent slat 16, 18. Alternatively, or in addition, strengthening webs 44 may be disposed above the respective slats 16, 18, so that the respective slats 16, 18 are disposed between them. The webs 44 extend along the radially inner and outer edges of the flow control walls 20. The webs 44 may serve to limit the displacement of the slats 16, 18, and to define their profile in the limit positions.

Figure 17:
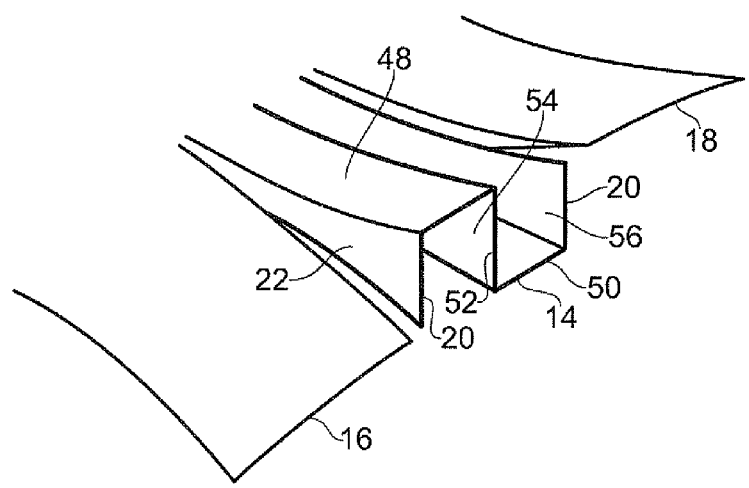
FIG. 17 illustrates the configuration of a fixed slat at the nozzle exit.

FIG. 17 shows an embodiment in which the fixed slats 14 (see FIG. 1) between adjacent movable slats 16, 18 are profiled so that an offset region is provided between the respective flow control walls 20. Thus, the fixed slat 14 has axially extending regions 48, 50 which are radially offset from each other and are interconnected by a radially extending wall 52. The flow control walls, the axially extending regions 48, 50 and the radial wall 52 thus form axially extending channels 54, 56 which are disposed circumferentially side-by-side, and open respectively radially inwardly and radially outwardly with respect to the engine axis X.

This profile of the fixed slat 14 provides additional stiffness to the structure, without creating a significant drag penalty.

In the cruise configuration shown in FIG. 17, the area-reducing movable slat 16 is in its radially inwards limit position while the area-increasing movable slat 18 is shown in its radially outer limit position.

In the embodiments described above, the slats 16, 18 are made from, or incorporate, a shape memory material, such as a shape memory alloy, and the slats 16, 18 are provided with heating means for controlling heating of the slats 16, 18 to a temperature above the transition temperature of the material. Consequently, by control of the heating means, the respective slat 16, 18 can be caused to deform from its nominal position as shown, for example, in FIG. 2, to its radially displaced condition.

Figure 18:
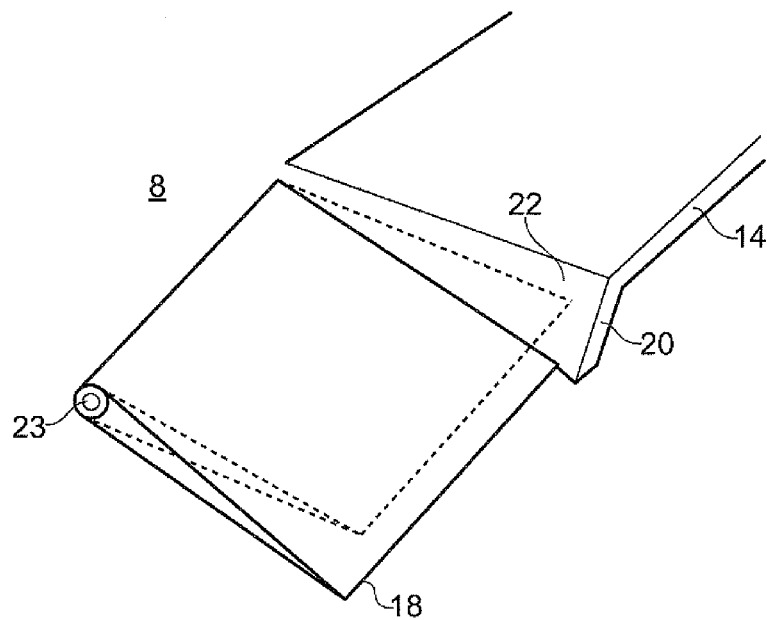
FIG. 18 shows an alternative mechanism for a movable slat.

Alternative means for displacing the movable slat 16, 18 may be provided, for example as shown in FIG. 18, in which the slat 16, 18 is hinged at 23 in a conventional manner to the nozzle body 8, for actuation by a suitable actuating mechanism. In FIG. 18, an area-increasing slat 18 is shown, movable from a nominal position shown in full outline to an area-increased position shown in dashed outline. It will be appreciated that the same operating principle can be applied also to an area-reducing slat 16.

In the embodiments described above, the slats 16, 18 have been described as displaceable with respect to the nozzle body 8 about an axis, or an effective axis, which extends tangentially with respect to the engine axis X. Nevertheless, the principles underlying the present invention may also be applied to movable slats which are mounted on fixed slats 14 for pivoting about axially extending axes at the circumferential edges of the fixed slats 14. Any suitable actuator mechanism may be provided, as alternatives to the use of shape memory materials and hinged slats as described above. For example externally actuated morphing slats may be employed.

As shown in FIG. 1, the nozzle body 8 described is curved, and generally circular, although the profile of the nozzle body 8 at its junction with the slats 14, 16, 18 will be faceted in order to accommodate the slats 16, 18. It will be appreciated that the principles underlying the present invention can be applied also to non-circular exit nozzles 6, for example exhaust nozzles having rectangular or rectilinear shapes. It will be appreciated also that the principles underlying the present invention can be applied to core engine exhaust nozzles 10, as well as bypass exhaust nozzles 6.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A gas turbine engine exhaust nozzle having a nozzle exit and comprising a nozzle body and a plurality of slats which extend generally axially of the nozzle body and are distributed circumferentially around the nozzle exit, at least some of the slats being movable inwardly and/or outwardly with respect to the nozzle axis, radially extending flow control surfaces being provided on flow control walls that are fixed with respect to the nozzle axis, the flow control walls being disposed between adjacent ones of the movable slats, whereby respective circumferential edges of the adjacent slats are movable of the respective oppositely disposed flow control surfaces of the respective common flow control walls, and circumferential edges of the movable slats move over the flow control surfaces during movement of the slats, a surface area of each radially extending flow control surface being greater than a circumferential surface area of each flow control wall, wherein a radially inwardly surface of each movable slat is configured to receive a ducted fan exhaust flow, and a radially outwardly facing surface of each movable slat is configured to receive an air flow from a nacelle.

2. A gas turbine engine exhaust nozzle as claimed in claim 1, in which the flow control surfaces extend over the full range of movement of the circumferential edges of at least some of the movable slats.

3. A gas turbine engine exhaust nozzle as claimed in claim 1, in which the flow control surfaces extend over part only of the range of movement of the circumferential edges of at least some of the movable slats.

4. A gas turbine engine exhaust nozzle as claimed in claim 1, in which each movable slat is movable between a nominal position and an area-adjusted position.

5. A gas turbine engine exhaust nozzle as claimed in claim 4, in which each movable slat is movable from the nominal position to respective area-adjusted positions in opposite radial directions from the nominal position.

6. A gas turbine engine exhaust nozzle as claimed in claim 4, in which the nominal position of each movable slat corresponds to an optimum nozzle exit area for a cruise operating condition of the engine.

7. A gas turbine engine exhaust nozzle as claimed in claim 1, in which flow control walls are disposed between adjacent ones of the movable slats whereby respective circumferential edges of the adjacent slats are movable over the respective oppositely disposed flow control surfaces of the respective common flow control walls.

8. A gas turbine engine exhaust nozzle as claimed in claim 7, in which cooperating means is provided on the movable slats and on the flow control walls for arresting movement of the movable slats at limit positions.

9. A gas turbine engine exhaust nozzle as claimed in claim 8, in which the cooperating means comprises a plurality of spaced stop elements which are distributed axially with respect to the nozzle axis.

10. A gas turbine engine exhaust nozzle as claimed in claim 8, in which the cooperating means comprises slots in the flow control walls, which slots are engaged by respective pegs mounted on the movable slats whereby at least one slot end of each slot defines a limit position of the respective movable slat.

11. A gas turbine engine exhaust nozzle as claimed in claim 10, in which each flow control surface is provided with a plurality of axially spaced slots engaged by respective pegs of the respective removable slat, respective ends of the slots establishing the profile of the respective slat in its limit position.

12. A gas turbine engine exhaust nozzle as claimed in claim 8, in which the cooperating means comprises a latch mechanism.

13. A gas turbine engine exhaust nozzle as claimed in claim 12, in which the latch mechanism comprises a latch recess in the flow control wall which is engagable by a latch element on the respective slat.

14. A gas turbine engine exhaust nozzle as claimed in claim 8, in which the flow control walls are carried by fixed slats disposed between adjacent ones of the movable slats.

15. A gas turbine engine exhaust nozzle as claimed in claim 14, in which the fixed slats have axially extending regions which are radially offset with respect to each other.

16. A gas turbine engine exhaust nozzle as claimed in claim 15, in which the axially extending regions define at least two axially extending channels disposed circumferentially side-by-side and opening respectively in the radially inward and outward directions.

17. A gas turbine engine exhaust nozzle as claimed in claim 8, in which the flow control walls are carried by the nozzle body and extend between adjacent ones of the movable slats.

18. A gas turbine engine exhaust nozzle as claimed in claim 17, in which the circumferential width of each flow control wall reduces in the direction away from the nozzle body.

19. A gas turbine engine exhaust nozzle as claimed in claim 17, in which the radial dimension of each flow control wall at its junction with the nozzle body is greater than the radial thickness of the nozzle body at the junction.

20. A gas turbine engine exhaust nozzle as claimed in claim 17, in which at least one of the flow control surfaces of at least one of the flow control walls lies in a plane which is oblique to the nozzle axis.

21. A gas turbine engine exhaust nozzle as claimed in claim 17, in which each flow control wall has a reinforcing web extending laterally of the flow control wall and overlapping an adjacent one of the movable slats.

22. A gas turbine engine exhaust nozzle as claimed in claim 21, in which the reinforcing web is one of a pair of reinforcing webs extending respectively to opposite sides of the flow control wall.

23. A gas turbine engine exhaust nozzle as claimed in claim 21, in which the or each reinforcing web is one of a pair of reinforcing webs disposed radially inwardly and radially outwardly of the respective movable slat.

24. A gas turbine engine exhaust nozzle as claimed in claim 8, in which at least part of at least some of the flow control walls is pivotable with respect to the nozzle body to lie parallel to an adjacent slat.

25. A gas turbine engine exhaust nozzle as claimed in claim 1, in which a sealing element is provided at each circumferential edge of each movable slat, the sealing element being in sliding contact with the adjacent flow control surface.

26. A gas turbine engine exhaust nozzle as claimed in claim 1, in which at least some of the movable slats are hinged to the nozzle body.

27. A gas turbine engine comprising an exhaust nozzle as claimed claim 1.

28. A gas turbine engine as claimed in claim 27, the gas turbine engine further comprising a nacelle, a rear part of the nacelle comprising the nozzle body of the exhaust nozzle.

* * * * *